April 10, 1962 G. E. JEFFRES 3,028,691
STUMP REMOVAL APPARATUS
Filed June 4, 1959 3 Sheets-Sheet 1

Inventor
George E. Jeffres
By Donald L. Welsh
Attorney

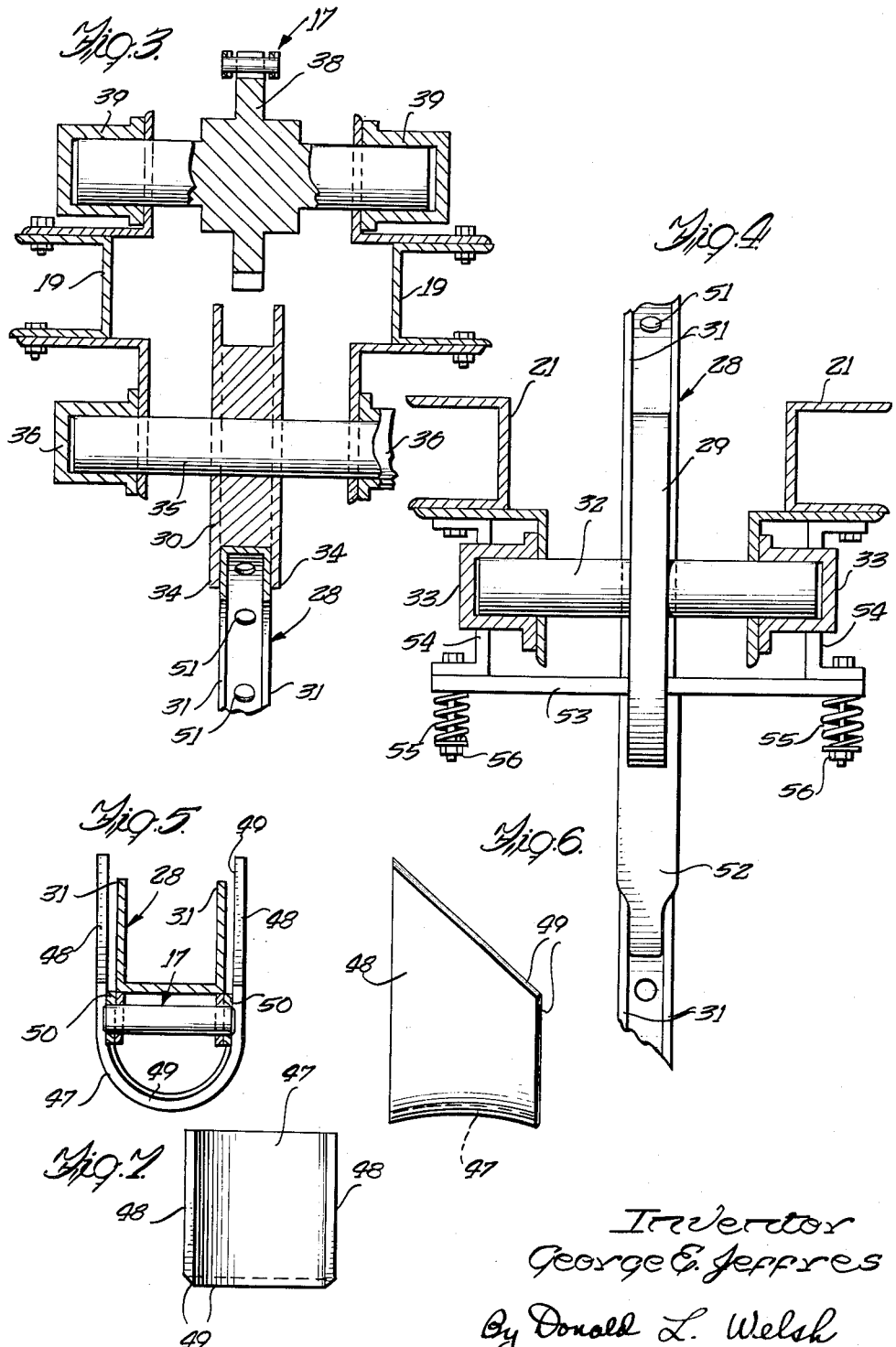

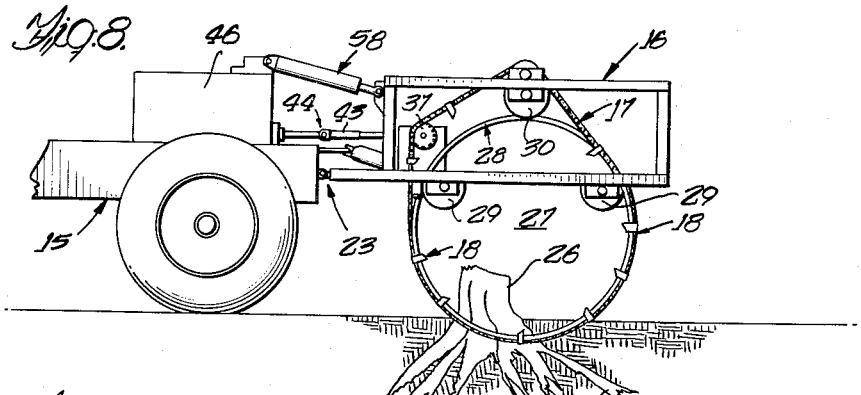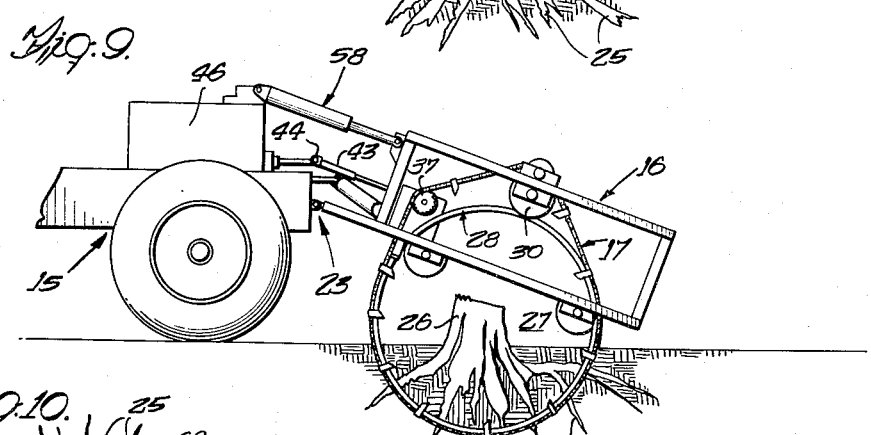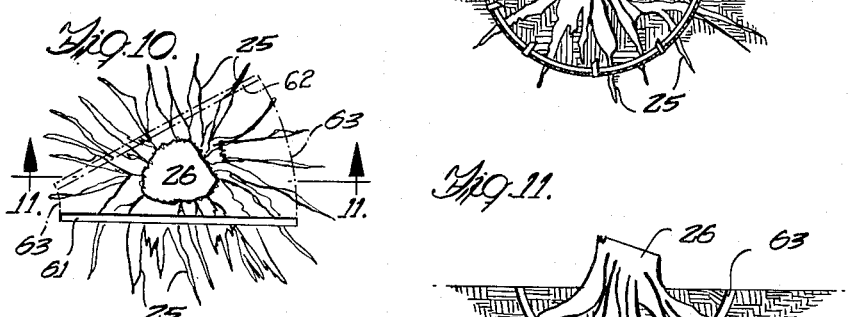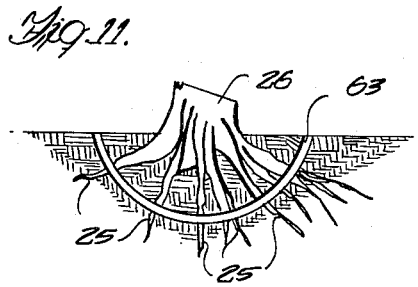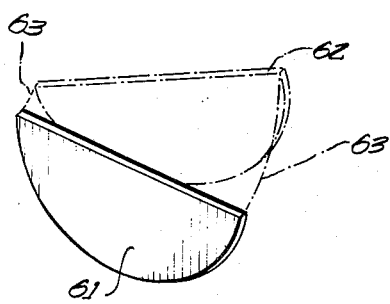

# United States Patent Office 3,028,691
Patented Apr. 10, 1962

3,028,691
STUMP REMOVAL APPARATUS
George E. Jeffres, 1116 E. Taylor St. Bloomington, Ill.
Filed June 4, 1959, Ser. No. 818,205
13 Claims. (Cl. 37—2)

This invention relates to apparatus for removing tree stumps from the ground and the primary object is to provide such apparatus which is constructed in a novel manner to sever all of the roots thereby leaving the stump free to be lifted out of the ground.

A further object is to support cutting elements in a novel manner for freeing a tree stump from the ground by cutting roots beneath as well as around the stump.

A more detailed object is to guide an endless flexible cutter carrier in a novel manner to provide a horizontally opening recess to receive a tree stump while the carrier is being moved horizontally to cut roots beneath the stump.

The invention also resides in the novel and simple construction of the carrier supporting mechanism to achieve the desired carrier movement.

Other objects and advantages of the invention will become apparent from the following description taken in connection with the accompanying drawings in which:

FIG. 3 is a fragmentary sectional view taken along the line 3—3 of FIG. 1;

FIG. 4 is a fragmentary sectional view taken along the line 4—4 of FIG. 1;

FIG. 5 is a sectional view taken along the line 5—5 of FIG. 1;

FIG. 6 is a side elevational view of a cutter blade;

FIG. 7 is a plan view of one of the cutter blades;

FIGS. 8 and 9 are fragmentary side elevational views showing the apparatus in different positions relative to a stump;

FIG. 10 is a schematic plan view showing the different cuts made by the apparatus and their relation to a stump;

FIG. 11 is a sectional view taken along the line 11—11 of FIG. 10; and

FIG. 12 is a schematic perspective view showing the different cuts made by the apparatus.

Figure 2:
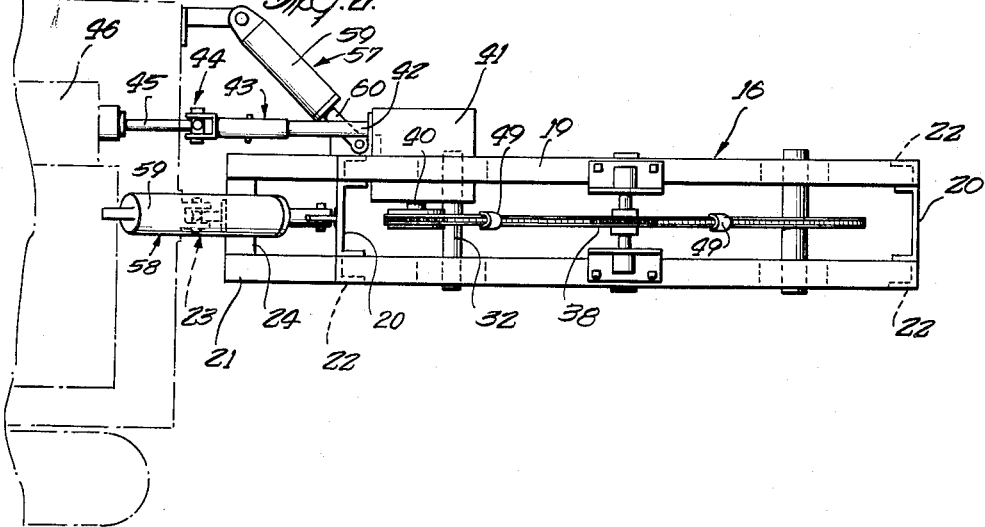
FIG. 2 is a plan view of the apparatus.

The tree stump removal apparatus shown in the drawings to illustrate the present invention is mounted on a wheeled vehicle or support 15, such as a tractor or truck for easy transportation from place to place. In general, the apparatus comprises a framework 16 mounted on the vehicle and supporting a carrier 17 for one or more cutters 18. The framework 16 herein is formed of an upper pair of horizontally disposed bars 19 of channel cross section welded to and laterally spaced apart by cross members 20 and secured to and spaced vertically from a lower pair of similarly connected bars 21 by upright spacers 22. For a purpose to appear later, the framework is mounted on the wheeled vehicle through the medium of a universal joint 23 of suitable construction connected to a spacer 24 which joins extensions of the lower channels 21 at one of their ends (FIG. 2).

In accordance with the present invention, the cutter carrier 17 and the cutters 18 thereon are constructed and mounted in a novel manner to sever all of the roots 25 beneath as well as around the sides of the stump 26 thereby freeing the stump of all connections with the ground. To this end, the carrier is an endless flexible element guided for movement along an arcuate path extending beneath the framework 16 and co-operating therewith to define a recess 27 which opens horizontally and is large enough to receive the stump so that the cutters may operate beneath the stump. Such guiding is effected by a ring 28 mounted on the framework to rotate in a vertical plane and having a portion depending from the framework to define the recess. The carrier extends around and advances with the outer periphery of the ring with each cutter extending around the outer side of the carrier and also radially and inwardly past the inner periphery of the ring. By virtue of such radial extension, the carrier, while advancing in a vertical plane, also may be shifted horizontally in a direction generally paralleling the ring axis.

The desired mounting for the guide ring 28 enabling the carrier 17 to move in its path around the recess 27 comprises at least three wheels 29 and 30 engaging a portion of the ring at circumferentially spaced points adjacent the framework 16 so as to leave another portion of the ring depending from the framework. To provide a recess of large size while keeping the diameter of the ring small, the outer wheels 29 engage the ring on either its inner periphery or its outer periphery and the middle wheel engages the ring on its other periphery. With this arrangement, the wheels may be spaced along less than half of the circumference of the ring thereby permitting more than half of the ring to project below the framework. Preferably, the middle wheel 30 engages the outer side or periphery of the ring and the outer wheels engage the inner periphery to distribute the weight of the ring. The axes of the wheels are horizontally disposed parallel to each other and the axis of the ring and the wheels and ring are disposed in the same vertical plane.

The guide ring 28 is maintained in the same vertical plane on the framework 16 by axially engaging parts on the ring and its supporting wheels 29 and 30. In this instance, the parts on the ring are inwardly extending radial flanges 31 along opposite edges of the ring. These flanges straddle the outer wheels 29 which herein are formed simply as flat disks having stub shafts 32 projecting rigidly from opposite sides and journaled in bearings 33 on the lower frame channels 21. Being on the outer periphery of the ring, the middle wheel 30 is formed with axially spaced and radially projecting flanges 34 straddling the ring and engaging the ring flanges 31 (see FIG. 3). This wheel similarly is secured by welding to a shaft 35 journaled in bearings 36 on the upper frame channels 19.

Although power for advancing the carrier 17 may be transmitted through the guide ring 28 as by driving the ring and providing a driving connection between the ring and the carrier, the power is applied directly to the carrier in this instance. To obtain a positive drive, it is preferred to form the carrier as a link chain meshing with a drive sprocket 37 rotatably mounted on the framework 16. In addition to this sprocket, the carrier chain extends around and meshes with an idler sprocket 38 with a shaft rotatably mounted in bearings 39 on the tops of the upper channels 19 above the middle guide ring wheel 30 so as to guide the chain above and around that wheel. In this instance, the drive sprocket is fast on the output shaft 40 of suitable reduction gearing 41 whose input shaft 42 is driven through an extensible connection 43 and a universal joint 44 from a drive shaft 45 on the wheeled vehicle 15. Such drive shaft may be driven directly by a motor 46 or may be the power take-off shaft of the vehicle in the case of vehicles having such shafts. The direction of advance of the chain around the guide ring and the sprockets is clockwise as viewed in the drawings.

Figure 1:
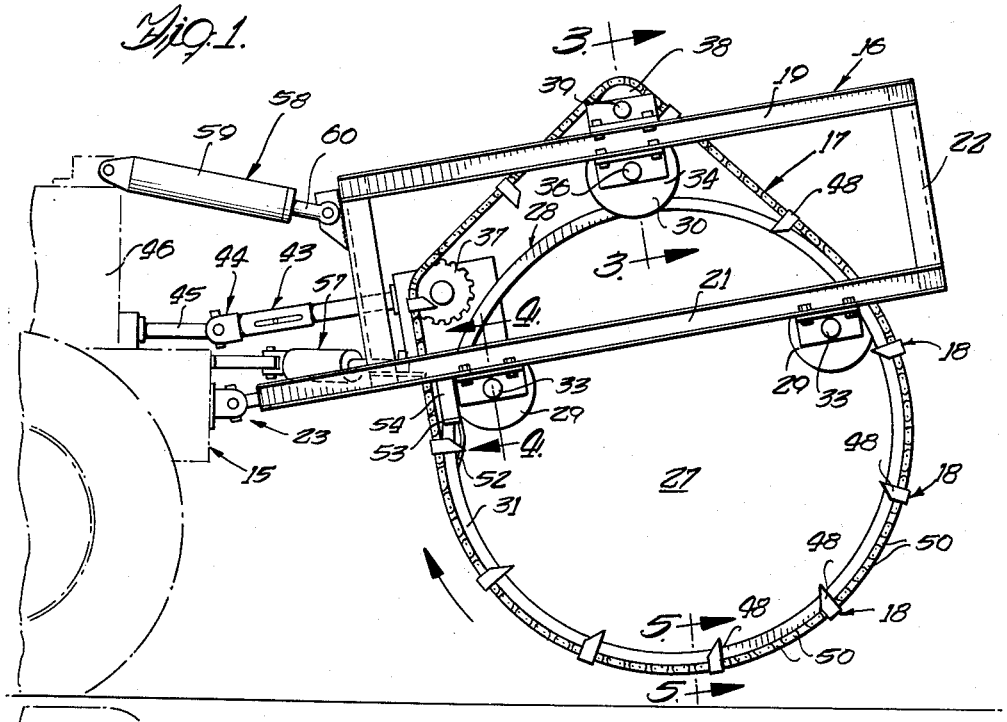
FIGURE 1 is a side elevational view of stump removal apparatus embodying the novel features of the present invention, a portion of a supporting wheeled vehicle being shown schematically.

Preferably, there are a plurality of cutting elements 18 secured to the carrier chain 17 at spaced points so that one element follows another around the guide ring 28. To achieve a cutting action during vertical movement of the chain, each element is formed as a blade having one section 47 (FIGS. 5 to 7) extending across the outer side of the chain. Cutting during horizontal movement of the chain with part of the chain under ground is effected by forming each element with at least one other section 48 extending from the outer section radially and inwardly past the inner periphery of the guide ring (FIGS. 1 and 5). Preferably, there are two such other sections 48, one extending inwardly along each side of the guide ring and both projecting radially and inwardly past the ring so that the cutting may be effected horizontally in either direction along the axis of the guide ring. Each blade thus is of U-shape and its leading edge 49 on all sections is sharpened.

The cutter blades 18 in this instance are secured to the link bars 50 in the carrier chain 17, each of the laterally spaced leg sections 48 of each blade being welded to the adjacent link bar. With the legs thus secured to the chain and extending along opposite sides of the guide ring 28, the blades perform a function in addition to cutting roots, that is, they guide the chain around the ring and prevent shifting of the chain axially off the periphery of the ring. The leading edge 49 of each blade then constitutes cutter means actually severing roots and the remainders of the leg sections 48 constitute guide elements maintaining the chain on the ring. The location of the outer guide wheels 29 between the flanges 31 of the guide ring enables the blade legs to move past these guide wheels even though the legs lie alongside the flanges. The idler sprocket 38, however, guides the chain and cutter blades away from the middle guide wheel 30 whose flanges 34 otherwise would interfere with the blade legs.

To insure proper guiding of the ring 28 on its support wheels 29 and 30, means are provided to keep dirt and other foreign matter from filling the space between the guide ring flanges 31 and thereby interfering with a proper rolling of the outer wheels along the inner side of the ring. This means includes holes 51 extending through and spaced around the ring. In addition, a scraper 52 is mounted on the framework 16 to extend between the flanges and engage the inner periphery of the ring just ahead of the outer wheel 29 first contacted by successive sections of the ring. Herein, this scraper is an elongated finger extending downwardly from a crosspiece 53 and narrow enough to pass between the cutter legs 48 and the ring flanges 31. The crosspiece is rigid with the upper end of the scraper and is mounted on the lower channels 21 by depending brackets 54, the crosspiece being urged against the bottoms of the brackets by coiled springs 55 which act between the crosspiece and the heads of bolts 56 encircled by the springs and extending through the brackets (FIG. 4). These springs permit the scraper normally to be disposed against the guide ring but to move yieldably away from the ring in case an obstruction is encountered.

The purpose of the universal joint 23 connecting the framework 16 to the wheeled vehicle 15 is to provide a simple means for supporting the framework and still permitting the same to be moved both horizontally and vertically to effect the cutting action beneath as well as around all sides of the stump 26 without changing the position of the vehicle. Such movement preferably is effected by individually operable power actuators 57 and 58 acting between the vehicle and the framework and respectively operable to shift the framework horizontally and vertically. For purposes of illustration, these actuators are shown as being of the pressure fluid type having cylinders 59 pivotally connected to the vehicle and pistons with rods 60 pivotally connected to the framework at points spaced from the universal joint. Suitable pressure fluid circuits and controls (not shown) are provided for selectively admitting pressure fluid to and discharging fluid from the respective cylinders to effect the desired movement of the framework.

In the operation of the improved stump removal apparatus, the wheeled vehicle 15 is moved to position the guide ring 28 and chain 17 above the ground as shown in FIG. 1 and in a vertical plane extending alongside and closely adjacent one side of the stump 26 as indicated by full lines in FIG. 11. Then, with power being delivered to the drive sprocket 37 so as to advance the chain continuously in a clockwise direction as viewed in FIGS. 1, 8 and 9 so that the sharpened edges 49 of the cutter blades 18 are leading, the vertical fluid pressure actuator 58 is activated to lower the framework 16 relative to the vehicle while keeping the guide ring and chain in the same plane. As the cutter blades engage the ground and the roots 25 in the descent of the framework, they make a slot 61 (FIGS. 11 and 12) with an arcuate bottom and with a width equal approximately to the width of the cutters. Any cuttings or other debris is carried out of the slot with the blades and the guide ring 28 which advances with the chain, the scraper 52 and the guide ring holes 51 co-operating to keep the ring clean.

When the lower edge of the slot 61 is lower than the main body of the stump 26 as shown in FIG. 9, the framework 16 is raised and the chain 17 and guide ring 28 are lifted out of the slot and above the stump. The horizontal actuator 57 then is actuated to shift the framework horizontally above the stump to position the chain and guide ring in a vertical plane on the other side of the stump. The framework then is lowered to cut a second slot 62 similar to but laterally spaced from the first slot 61, the second slot being indicated by the dot-dash line in FIG. 10. When the second slot is of substantially the same depth as the first slot and while the chain is still advancing along the curved bottom edge of the second slot, the framework is shifted horizontally and reversely to make a partially toroidal cut joining the bottom edges of the vertical slots, such cut being indicated by lines 63 in FIGS. 10 and 12 and shown in section in FIG. 11. During this horizontal movement, the chain and cutters continue to carry cuttings out of the partially toroidal cut and the scraper 52 and guide ring holes 51 continue to clean the guide ring. Also, the leading ones of the cutter legs 48, due to their projection radially and inwardly beyond the guide ring, cut a path through the roots and ground ahead of the ring.

Once the chain 17 and guide ring 28 reach the first slot 61 in their horizontal movement from the second slot 62, they are withdrawn vertically through the first slot and are raised above the ground. All of the roots 25 connecting the stump 26 to the ground including the roots beneath the stump then will have been severed and the stump may be removed simply by lifting it out of the hole defined by the slots and the toroidal cut 63. Such cutting of roots and the resulting simple removal of stumps are made possible by mounting the cutters and their carrier for movement around the recess 27 which receives the stump to permit the horizontal movement of the cutters beneath the stump. Also, the projection of the cutter blades 18 radially and inwardly past the guide ring on at least one side enables the ring to be shifted horizontally with the cutters along the ring axis and in the direction of that side. By so extending the cutter blades inwardly past the guide ring on both of its sides, the ring and cutters may be moved horizontally in both directions.

I claim as my invention:

1. Tree stump removal apparatus having, in combination, a wheeled support, an elongated framework pivotally mounted at one end on said support for movement both vertically and horizontally from a generally horizontal inactive position, two power actuators acting between said support and said framework and operable when energized to swing the framework respectively horizontally and vertically relative to the support, a ring of channel cross section having laterally spaced flanges projecting radially and inwardly from a bottom perforated along its length to provide cleaning holes, two wheels mounted on said framework to rotate about parallel horizontal axes at horizontally spaced points and projecting between said flanges of said ring to engage the ring at circumferentially spaced points with a portion of the ring depending from the framework in a vertical plane to define a horizontally opening stump receiving recess, a third wheel mounted on said framework to rotate about an axis parallel to said axes of said two wheels and engaging the outer periphery of said ring between the two wheels, radial flanges on said third wheel straddling said ring and engaging said ring flanges to co-act with said two wheels and the ring flanges to support the ring for rotation about an axis parallel to the wheel axes and to prevent shifting of the ring relative to said framework either radially or along such axes, a scraper yieldably mounted on said framework and projecting between said ring flanges to co-act with said holes to clean the ring, a guide sprocket mounted on said framework to rotate about an axis paralleling said ring axis and spaced above said third wheel, an elongated flexible chain extending around said sprocket and the outer side of said depending portion of said ring and movable with such portion about the ring axis, a drive sprocket rotatably mounted on said framework and meshing with said chain between said ring and said guide sprocket, power actuated drive means connected to said drive sprocket and operable when energized to rotate the sprocket and advance said chain, a plurality of cutter elements of U-shape secured to said chain at spaced points and having a bottom extending across the outer periphery of the chain and laterally spaced legs straddling the chain and projecting inwardly therefrom to straddle said ring and guide the chain around the ring, at least one of said legs of each of said cutter elements projecting inwardly beyond the ring to cut a path to receive the ring during horizontal movement of said depending portion of the ring underground.

2. Tree stump removal apparatus having, in combination, a wheeled support, an elongated framework mounted on said support for movement both vertically and horizontally from a generally horizontal inactive position, a ring of channel cross section having laterally spaced legs projecting radially and inwardly from the outer periphery of the ring, two wheels mounted on said framework to rotate about parallel horizontal axes at horizontally spaced points and projecting between said legs of said ring to engage the ring at circumferentially spaced points with a portion of the ring depending from the framework in a vertical plane to define a horizontally opening stump receiving recess, a third wheel mounted on said framework to rotate about an axis parallel to said axes of said two wheels and engaging the outer periphery of said ring between the two wheels, radial flanges on said third wheel straddling said ring and engaging said legs to coact with said two wheels and the legs to support the ring for rotation about an axis parallel to the wheel axes and to prevent shifting of the ring relative to said framework either radially or along such axes, a guide sprocket mounted on said framework to rotate about an axis paralleling said ring axis and spaced above said third wheel, an elongated flexible chain extending around said sprocket and the outer side of said depending portion of said ring and movable with such portion about the ring axis, power actuated drive means connected to said chain and operable when energized to advance said chain, and cutter means carried by said chain.

3. Tree stump removal apparatus having, in combination, an elongated framework mounted for movement both vertically and horizontally from a generally horizontal inactive position, a ring of channel cross section having laterally spaced legs projecting radially and inwardly from the outer periphery of the ring, two wheels mounted on said framework to rotate about parallel horizontal axes at horizontally spaced points and projecting between said legs of said ring to engage the ring at circumferentially spaced points with a portion of the ring depending from the framework in a vertical plane to define a horizontally opening stump receiving recess, a third wheel mounted on said framework to rotate about an axis parallel to said axes of said two wheels and engaging the outer periphery of said ring between the two wheels, radial flanges on said third wheel straddling said ring and engaging said legs to co-act with said two wheels and the legs to support the ring for rotation about an axis parallel to the wheel axes and to prevent shifting of the ring relative to said framework either radially or along such axes, an endless flexible carrier extending around the outer side of said depending portion of said ring and movable with such portion about the ring axis, power actuated drive means connected to said carrier and operable when energized to advance the carrier, and cutter means carried by said carrier.

4. Tree stump removal apparatus having, in combination, an elongated supporting framework mounted for bodily movement both vertically and horizontally from a generally horizontal inactive position, a ring mounted on said framework for rotation in a vertical plane and having a portion extending downwardly below the framework to define a horizontally opening stump receiving recess, the mounting for said ring comprising three rotary members engaging the ring at points spaced along its periphery and maintaining the ring in said plane during horizontal and vertical movement of said framework, an endless flexible carrier extending around the outer periphery of said ring and supported by the ring and on said framework for movement around and with said downwardly extending portion of the ring, and at least one cutter element of U-shape secured to said carrier and having one section extending across the outer periphery of the carrier and two laterally spaced sections extending along opposite sides of the carrier and projecting radially from the carrier and inwardly beyond the inner periphery of said ring to cut a path to receive the ring during horizontal movement of the downwardly extending portion of the ring in both directions longitudinally of the axis of the ring.

5. Tree stump removal apparatus having, in combination, a support, an elongated framework mounted at one end on said support for bodily movement both vertically and horizontally from a generally horizontal inactive position, two power actuators acting between said framework and said support and operable when energized to shift the framework respectively horizontally and vertically relative to the support, a ring mounted on said framework for rotation in a vertical plane and having a portion extending downwardly below the framework to define a horizontally opening stump receiving recess, the mounting for said ring comprising three rotary members engaging the ring at points spaced along its periphery, said ring remaining in said plane during movement of said framework in said directions, an endless flexible carrier extending around the outer periphery of said ring and supported by the ring and on said framework for movement around and with said downwardly extending portion of the ring, and a cutter element projecting radially from the carrier and inwardly beyond the inner periphery of said ring to cut a path to receive the ring as it moves in said horizontal direction.

6. Tree stump removal apparatus having, in combination, an elongated supporting framework mounted for bodily movement both vertically and horizontally from a generally horizontal inactive position, a ring mounted on said framework for rotation in a vertical plane and having a portion extending downwardly below the framework to define a horizontally opening stump receiving recess, the mounting for said ring comprising three rotary members engaging the ring at points spaced along its periphery, an endless flexible carrier extending around the outer periphery of said ring and supported by the ring and on said framework for movement around and with said downwardly extending portion of the ring, and cutter means mounted on said carrier and having one portion extending across the outer periphery of the carrier to cut a path to receive said ring as it moves vertically and another portion projecting radially from the carrier and inwardly beyond the inner periphery of said ring to cut a path to receive the ring while the ring remains in a vertical plane and moves horizontally with said framework.

7. Tree stump removal apparatus having, in combination, a supporting framework mounted for movement both vertically and horizontally from a generally horizontal inactive position, a guide member mounted on said framework and having a portion extending downwardly below the framework in a vertical plane to define a horizontally opening stump receiving recess, a carrier extending along the outer side of said guide member in said plane and supported by the member and said framework for movement along the lower edge of said recess and cutter means mounted on said carrier and having one portion projecting upwardly from the carrier and beyond said guide member to cut a horizontal path receiving the member during horizontal movement of the member beneath the ground and a second portion extending transversely of the first portion and the guide member to cut a path receiving the guide member and carrier during vertical movement of the member.

8. Tree stump removal apparatus having, in combination, a framework mounted for movement bodily in transverse horizontal and vertical directions, a ring member having inner and outer peripheries, two rotary members engaging one of said peripheries of said ring member at spaced points and mounted to rotate about parallel horizontal axes extending longitudinally of said horizontal direction, a third rotary member mounted on said framework to rotate about an axis parallel to said axes of said two rotary members and engaging the other of said peripheries of said ring member between said spaced points so as to cooperate with the two rotary members to support the ring member in a vertical plane and for rotation about an axis parallel to the member axes with a portion of the ring member depending from the framework to define a horizontally opening stump receiving recess beneath the framework, flanges projecting radially from at least two of said members and coacting to maintain said ring member in said vertical plane during movement of said framework in said two directions, an endless flexible carrier extending around the outer periphery of said depending portion of said ring member in engagement therewith and movable with such portions about the ring member axis, power actuated drive means connected to said carrier and operable when energized to advance the carrier, and cutter means carried by said carrier.

9. Tree stump removal apparatus having, in combination, a framework mounted for movement bodily in transverse horizontal and vertical directions, a ring member having inner and outer peripheries, two rotary members engaging one of said peripheries of said ring member at spaced points and mounted to rotate about parallel horizontal axes extending longitudinally of said horizontal direction, a third rotary member mounted on said framework to rotate about an axis parallel to said axes of said two rotary members and engaging the other of said peripheries of said ring member between said spaced points so as to cooperate with the two rotary members to support the ring member in a vertical plane and for rotation about an axis parallel to the member axes with a portion of the ring member depending from the framework to define a horizontally opening stump receiving recess beneath the framework, said ring member remaining in said vertical plane during movement of said framework in said two directions, an endless flexible carrier extending around the outer periphery of said depending portion of said ring member in engagement therewith and movable with such portion about the ring member axis, power actuated drive means connected to said carrier and operable when energized to advance the carrier, and cutter means carried by said carrier.

10. Tree stump removal apparatus having, in combination, an elongated supporting framework mounted for bodily movement both vertically and horizontally from a generally horizontal inactive position, a ring mounted on said framework for rotation in a vertical plane and having a portion extending downwardly below the framework to define a horizontally opening stump receiving recess, the mounting for said ring comprising three rotary members engaging the ring at points spaced along its periphery and maintaining the ring in said plane during horizontal and vertical movement of said framework, an endless flexible carrier extending around the outer periphery of said ring and supported by the ring and on said framework for movement around and with said downwardly extending portion of the ring, and cutter means mounted on said carrier and extending both across the outer periphery of the carrier and along one side of the carrier radially and inwardly beyond the inner periphery of said ring to cut a path to receive the ring during movement of the ring both vertically and horizontally in a direction along the axis of the ring.

11. Tree stump removal apparatus having, in combination, a supporting framework, a ring member mounted on said framework for rotation in a vertical plane and having a portion extending downwardly below the framework and all supporting parts thereon to define a horizontally opening stump receiving recess, the mounting for said ring member comprising three rotary elements engaging the ring member at points spaced along its periphery and maintaining the ring in said plane during horizontal and vertical movement of said framework, means mounting said framework both for vertical movement and for movement horizontally in a direction normal to the plane of the ring member, an endless flexible member extending around and movable with said downwardly extending portion of said ring member, and guide elements secured to one of said members and engaging the other member to maintain the flexible member in proper position relative to the ring member.

12. Tree stump removal apparatus having, in combination, a supporting framework, a ring member having inner and outer peripheries and mounted on said framework for rotation in a vertical plane with more than half of the ring extending beyond the framework and supporting parts thereon to define a stump receiving opening, the mounting for said ring comprising two rotary elements engaging one of said peripheries of said ring member at spaced points and a third rotary element engaging the other periphery of the ring member between the first two elements, an elongated flexible member extending around and movable with said portion of said ring member extending beyond said framework, guide elements secured to one of said members and engaging the other member to maintain the flexible member in proper position on the ring member.

13. Tree stump removal apparatus having, in combination, a supporting framework, a ring mounted on said framework for rotation in a vertical plane and having a portion extending downwardly below the framework to define a horizontally opening stump receiving recess, an endless flexible carrier extending around the outer periphery of said ring and supported by the ring and on said framework for movement around and with said downwardly extending portion of the ring, and cutter means mounted on said carrier and extending both across the outer periphery of the carrier and along one side of the carrier radially and inwardly beyond the inner periphery of said ring to cut a path to receive said depending portion of the ring during movement of such portion both in the plane of the ring and horizontally in a direction longitudinally of the axis of the ring.

References Cited in the file of this patent

UNITED STATES PATENTS

| | | |
|---|---|---|
| 1,467,150 | Frere | Sept. 4, 1923 |
| 1,485,527 | Raeber | Mar. 4, 1924 |
| 1,507,460 | Carroll | Sept. 2, 1924 |
| 1,607,784 | Spangler | Nov. 23, 1926 |
| 1,892,525 | George et al. | Dec. 27, 1932 |
| 2,746,492 | DeHardit | May 22, 1956 |
| 2,755,570 | Blackburn et al. | July 24, 1956 |
| 2,769,278 | Wassell et al. | Nov. 6, 1956 |
| 2,914,866 | Vander Berg et al. | Dec. 1, 1959 |